(12) United States Patent
Hauvespre et al.

(10) Patent No.: US 11,204,088 B2
(45) Date of Patent: Dec. 21, 2021

(54) PULLEY DEVICE, IN PARTICULAR FOR TENSIONING IDLER OR RUNNER ROLLER

(71) Applicant: Aktiebolaget SKF, Gothenburg (SE)

(72) Inventors: Benoît Hauvespre, Saint Etienne de Chigny (FR); Gwenael Hingouet, Saint-Cyr-sur-Loire (FR); Thomas Perrotin, Saint Roch (FR); Nicolas Tronquoy, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 176 days.

(21) Appl. No.: 16/745,847

(22) Filed: Jan. 17, 2020

(65) Prior Publication Data
US 2020/0256449 A1  Aug. 13, 2020

(30) Foreign Application Priority Data

Feb. 11, 2019  (DE) .......................... 102019201752.5

(51) Int. Cl.
| | |
|---|---|
| *F16H 55/46* | (2006.01) |
| *F16H 7/12* | (2006.01) |
| *F16H 7/08* | (2006.01) |
| *F16H 55/56* | (2006.01) |
| *F16H 7/18* | (2006.01) |

(52) U.S. Cl.
CPC .......... *F16H 55/46* (2013.01); *F16H 7/1254* (2013.01); *F16H 7/18* (2013.01); *F16H 55/566* (2013.01); *F16H 2007/0865* (2013.01)

(58) Field of Classification Search
CPC .......... F16H 55/36; F16H 55/46; F16H 55/42; F16H 55/44; F16H 55/48; F16H 55/52; F16H 55/56; F16H 55/566; F16H 7/12; F16H 7/14; F16H 7/16; F16H 7/18; F16H 7/1254; F16H 2007/185; F16H 2007/0865
USPC .................................................. 474/198, 199
See application file for complete search history.

(56) References Cited

U.S. PATENT DOCUMENTS

| | | | | |
|---|---|---|---|---|
| 859,099 | A | * | 7/1907 | Nice ............... F16H 2007/0865 474/199 |
| 3,490,285 | A | * | 1/1970 | Donath ..................... F16H 7/12 474/187 |
| 3,771,843 | A | * | 11/1973 | Clasper .................. B62D 55/14 474/187 |
| 3,822,457 | A | * | 7/1974 | Frost ....................... F16H 55/44 29/892.11 |

(Continued)

FOREIGN PATENT DOCUMENTS

| | | |
|---|---|---|
| DE | 202005011230 U1 | 9/2005 |
| FR | 2692959 A1 * 12/1993 | ............. F16H 55/44 |

(Continued)

*Primary Examiner* — Michael R Mansen
*Assistant Examiner* — Raveen J Dias
(74) *Attorney, Agent, or Firm* — Garcia-Zamor Intellectual Property Law; Ruy Garcia-Zamor; Bryan Peckjian

(57) ABSTRACT

A pulley device provides a pulley and a bearing. The pulley has at least one C-shaped pulley part having an inner portion mounted on the bearing, an outer portion having an outer cylindrical surface dedicated to interact with a belt or a chain, and an intermediate portion extending substantially radially between axial ends of inner and outer portions on one axial side of pulley device. The outer cylindrical surface of outer ring is provided with at least one material deformation forming an axial stop for the pulley.

8 Claims, 4 Drawing Sheets

(56) References Cited

U.S. PATENT DOCUMENTS

| | | | | |
|---|---|---|---|---|
| 3,842,475 A * | 10/1974 | Clasper | B21D 53/26 | 29/892.11 |
| 3,915,511 A * | 10/1975 | Clasper | B60B 3/08 | 474/187 |
| 3,926,485 A * | 12/1975 | Frost | F16C 33/7886 | 384/510 |
| 4,443,210 A * | 4/1984 | Olschewski | F16H 7/1281 | 474/112 |
| 4,457,740 A * | 7/1984 | Olschewski | F16C 13/006 | 474/112 |
| 4,468,210 A * | 8/1984 | McCutchan, Jr. | F16H 55/44 | 474/170 |
| 4,591,352 A * | 5/1986 | Olschewski | F16C 13/006 | 384/505 |
| 4,602,875 A * | 7/1986 | Doerr | F16H 55/48 | 384/547 |
| 4,822,111 A * | 4/1989 | Albert | B60B 3/002 | 301/105.1 |
| 4,831,705 A * | 5/1989 | Kanemitsu | B21D 53/261 | 29/892.11 |
| 5,725,448 A * | 3/1998 | Kato | F16C 13/006 | 384/510 |
| 6,270,001 B1 * | 8/2001 | Tadic | B23K 31/02 | 228/245 |
| 7,485,059 B2 * | 2/2009 | Fadler | F16H 55/44 | 474/166 |
| 2002/0086754 A1 * | 7/2002 | Fukuwaka | F16C 33/416 | 474/199 |
| 2004/0178398 A1 * | 9/2004 | Miller | F16H 55/44 | 254/390 |
| 2004/0235599 A1 * | 11/2004 | Ozorak | F16C 25/08 | 474/199 |
| 2006/0142102 A1 * | 6/2006 | Radocaj | F16H 55/36 | 474/199 |
| 2008/0220921 A1 * | 9/2008 | Yanai | F16C 13/006 | 474/199 |
| 2008/0300077 A1 * | 12/2008 | Kapfer | F16C 13/006 | 474/133 |
| 2009/0191999 A1 * | 7/2009 | Joseph | F16H 55/36 | 474/199 |
| 2014/0031157 A1 * | 1/2014 | Takano | F16C 35/063 | 474/135 |
| 2016/0017978 A1 * | 1/2016 | Koda | F16H 55/44 | 474/166 |
| 2016/0245389 A1 * | 8/2016 | Albrecht | F16H 55/36 | |
| 2018/0023679 A1 * | 1/2018 | Basile | F16C 35/067 | 474/166 |
| 2019/0186612 A1 * | 6/2019 | Arnault | F16H 7/12 | |
| 2019/0323594 A1 * | 10/2019 | Arnault | F16C 19/18 | |
| 2019/0390756 A1 * | 12/2019 | Arnault | F16H 57/0031 | |
| 2020/0088274 A1 * | 3/2020 | Arnault | F16C 33/783 | |
| 2020/0200221 A1 * | 6/2020 | Inoue | F16C 33/78 | |
| 2020/0256378 A1 * | 8/2020 | Hauvespre | F16H 7/20 | |
| 2020/0256447 A1 * | 8/2020 | Arnault | F16C 19/08 | |
| 2020/0256448 A1 * | 8/2020 | Chollet | F16H 55/46 | |
| 2020/0263766 A1 * | 8/2020 | Arnault | F16H 55/44 | |
| 2020/0263776 A1 * | 8/2020 | Arnault | F16H 7/1254 | |
| 2020/0263777 A1 * | 8/2020 | Arnault | F16H 7/1254 | |
| 2020/0386304 A1 * | 12/2020 | Arnault | F16H 55/36 | |

FOREIGN PATENT DOCUMENTS

| | | | | |
|---|---|---|---|---|
| GB | 190509598 A | | 5/1906 | |
| GB | 141829 A | | 4/1920 | |
| WO | WO-9834053 A1 * | | 8/1998 | F16C 13/006 |
| WO | WO-2006092187 A1 * | | 9/2006 | F16C 13/006 |
| WO | WO-2007101771 A1 * | | 9/2007 | F16H 55/44 |
| WO | WO-2009017057 A1 * | | 2/2009 | F16C 37/007 |
| WO | WO-2009093539 A1 * | | 7/2009 | F16C 35/067 |
| WO | WO-2011098125 A1 * | | 8/2011 | F16H 55/44 |

* cited by examiner

PULLEY DEVICE, IN PARTICULAR FOR TENSIONING IDLER OR RUNNER ROLLER

CROSS-REFERENCE TO RELATED APPLICATIONS

This application claims priority to German Patent Application no. 102019201752.5, filed Feb. 11, 2019, the contents of which are fully incorporated herein by reference.

TECHNICAL FIELD OF THE INVENTION

The present invention relates to the field of pulley devices for tensioning idlers or runner rollers designed to interact with a chain or a belt, for example a distribution belt of an internal combustion engine of a vehicle.

BACKGROUND OF THE INVENTION

Such rollers are usually used to keep a constant tension on the belt or chain in a determined range or to locally modify the path taken by the chain or belt. These are called respectively tensioning idlers or runner rollers. In runner rollers, the pulley is mounted so as to rotate on a screw or a spindle by means of a rolling bearing, the roller then being attached directly or indirectly to the engine block or to an element of a tensioning idler device, for example an articulated arm or an eccentric.

Document GB 190509598 discloses a pulley comprising male and female overlapping parts which are interlocking relation and form a cylindrical outer portion intended to be in contact with a belt.

A major disadvantage of this pulley is that an annular recess is formed on the outer portion adapted to support the belt when the male and female parts are fastened together. There is therefore a risk of an early wear of the belt.

It is also known by document GB 141 829 a pulley comprising a peripheral part intended to be in contact with a belt, an inner part and a intermediate part between the inner and outer parts. The pulley is tightened to the outer ring of bearing, but the pulley can slightly axially move during the service use of pulley device. Moreover, with a pulley such as disclosed, the outer part may be deformed radially inwards by bending under the action of the belt.

It has been proposed in document DE 202005011230 U1 to house a damping ring within a C-shaped pulley, the damping element being dedicated to damp vibrations from the belt and being suitable to limit radial inward deformation of outer portion of the pulley. However, the pulley can still be deformed under heavy loads.

SUMMARY OF THE INVENTION

The aim of the invention is to overcome these drawbacks by proposing a pulley which is easy to install onto a bearing, of good rigidity, adapted to avoid an early wear of the belt, and permitting an efficient support of the belt.

To this end, the invention relates to a pulley device suitable for a belt of chain tensioning idler or runner roller, comprising a bearing and a pulley.

The bearing comprises a rotatable outer ring and a fixed inner ring, the rings being coaxial.

The pulley comprises at least one pulley part having in cross section an overall shape of a C, and having an inner portion with an inner surface mounted on an outer cylindrical surface of outer ring of bearing, an outer cylindrical portion having an outer cylindrical surface intended to be in contact with the belt or the chain, and a radial intermediate portion extending substantially radially between axial ends of inner and outer cylindrical portions on one axial side of pulley device, the pulley part being formed integral and defining an open end on one axial side opposite to the intermediate portion.

According to the invention, the outer ring is provided with at least one material deformation on a radial lateral surface on the axial side of intermediate portion of the pulley part. The material deformation radially protrudes out of the outer cylindrical surface of outer ring. The material deformation forms an axial stop for the pulley part in one axial direction.

According to further aspects of the invention which are advantageous but not compulsory, such a pulley device may incorporate one or several of the following features:

The bearing is a rolling bearing, at least one row of rolling elements being radially interposed between the inner ring and the outer ring.

The rolling elements are balls.

The rolling elements are equally circumferentially spaced and maintained by an annular cage.

The pulley is formed by only one pulley part.

The pulley comprises two C-shaped pulley parts mounted onto the outer cylindrical surface of outer ring of bearing, open ends of the pulley parts axially facing each other, free ends of outer portions of pulley parts being in axial abutment.

The two pulley parts are symmetrical with respect to a transverse radial plane passing through the centre of the bearing.

Both radial lateral surfaces of outer ring are provided each with at least one material deformation to form axial stops for intermediate portions of both pulley parts in both axial directions.

The total length of the inner portions of the two C-shaped pulleys mounted onto the outer ring is at least equal to 90% of the axial length of the outer cylindrical surface of the outer ring.

The outer portion of pulley part is of greater axial length than that of the inner portion, the outer portion protruding axially on at least one axial side of the inner portion.

The inner portion of pulley part is cylindrical, with an inner cylindrical portion.

The pulley part is made from a stamped metal sheet or blank.

The material deformation is formed by axial crimping of the radial lateral surface towards the opposite axial side.

The radial lateral surface comprises a plurality of material deformations.

Material deformations are circumferentially equally spaced.

BRIEF DESCRIPTION OF THE DRAWINGS

The invention will now be explained in correspondence with the annexed figures, as illustrative examples, without restricting the object of the invention. In the annexed figures.

DETAILED DESCRIPTION OF SOME EMBODIMENTS

Figure 1:
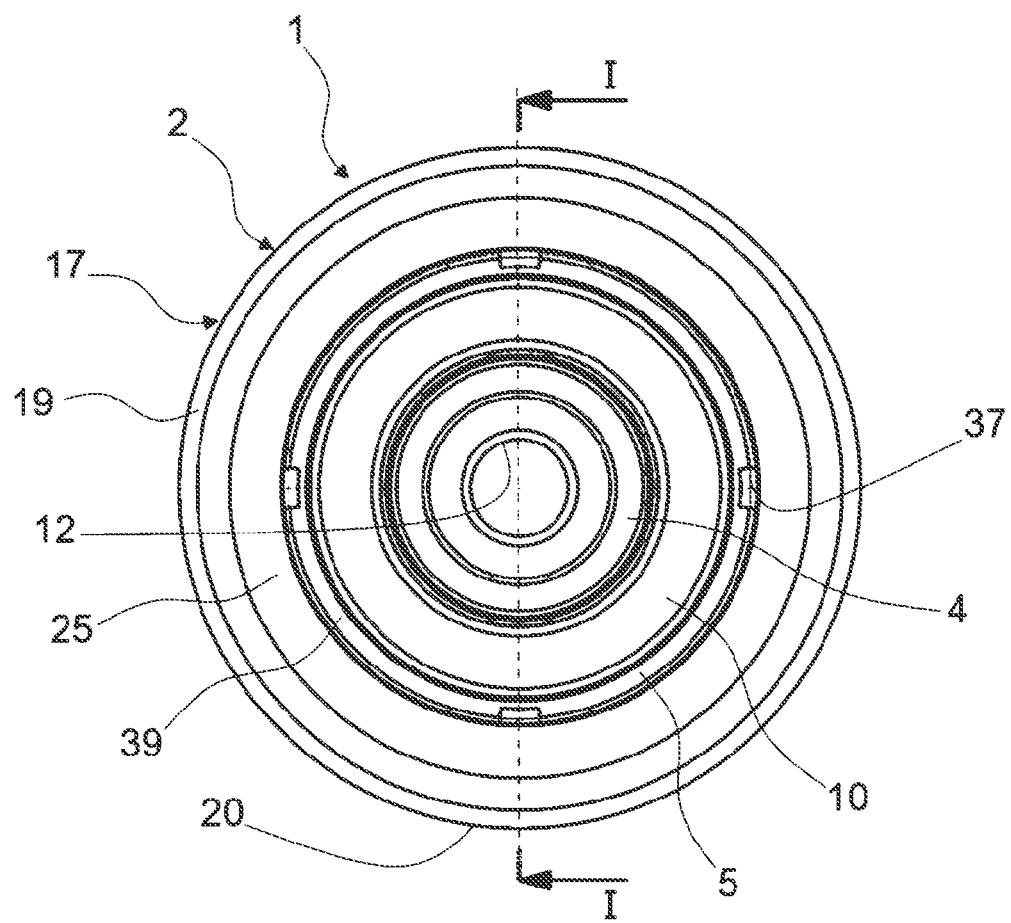
FIG. 1 is a side view of a pulley device according to an embodiment of the invention.
Figure 2:
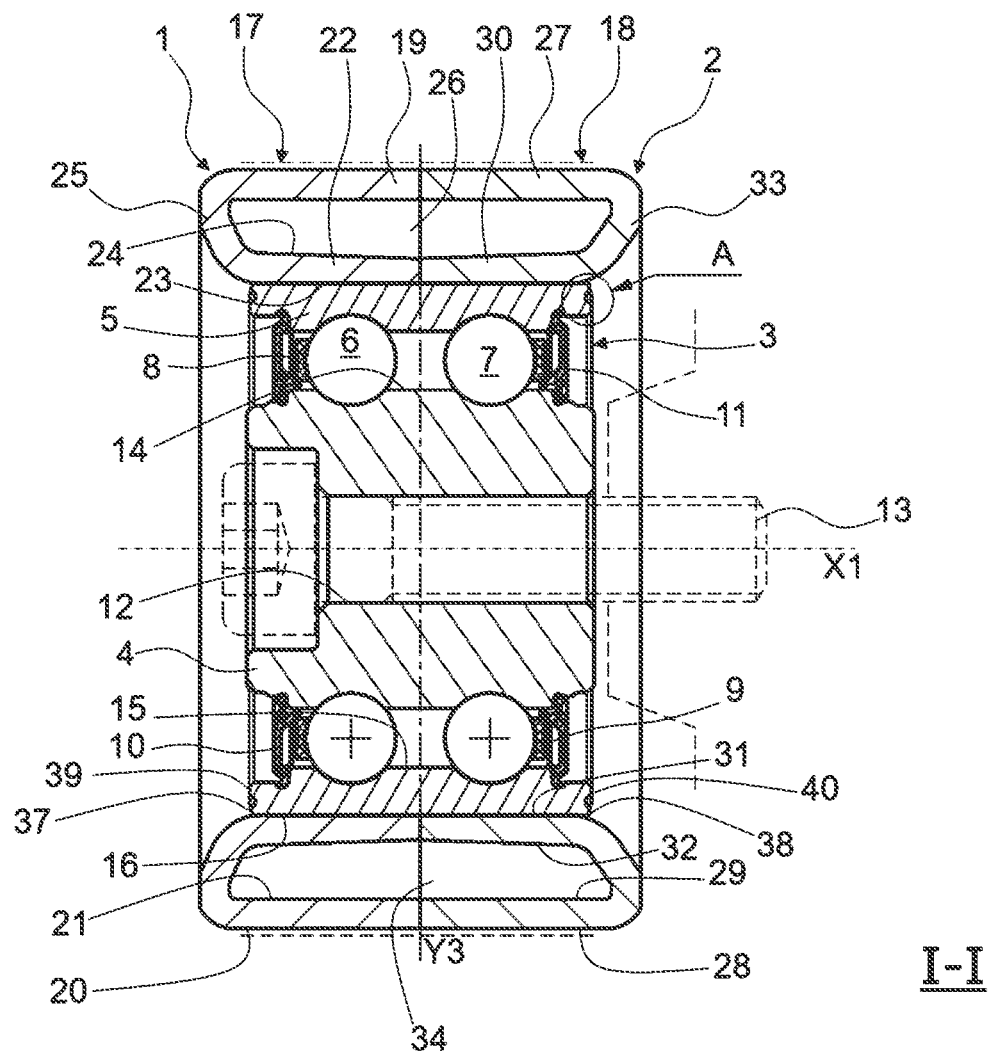
FIG. 2 is an axial section I-I of a pulley device of FIG. 1.
Figure 3:
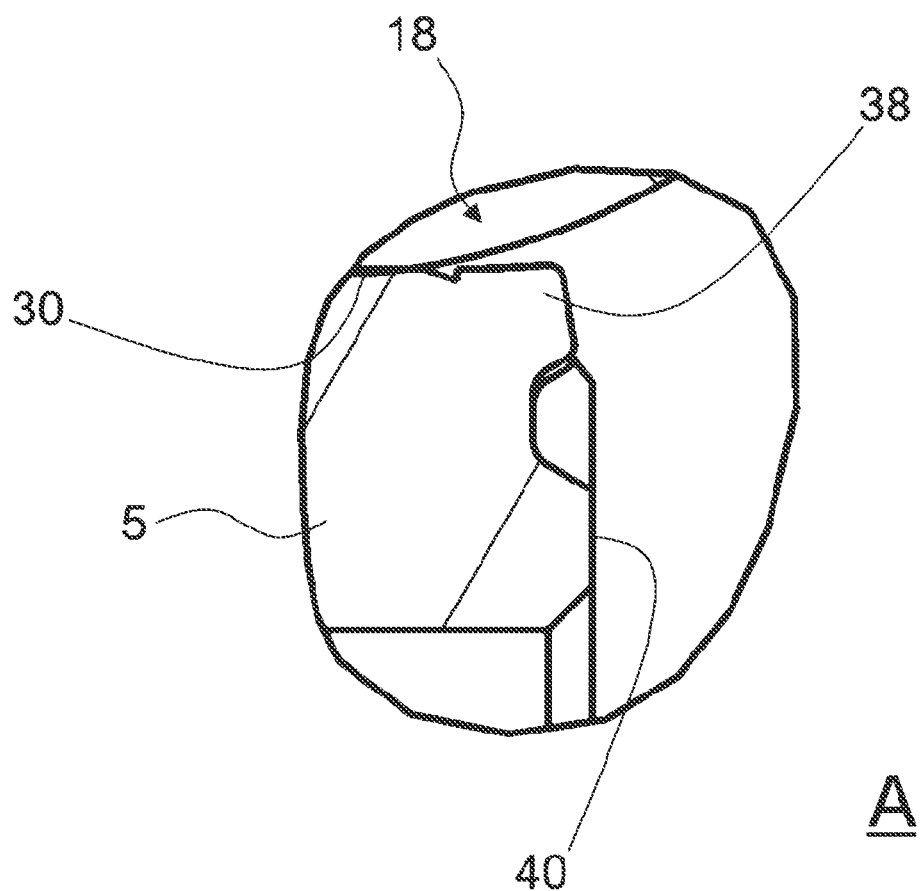
FIG. 3 is a detailed view A of the pulley device of FIG. 2.
Figure 4:
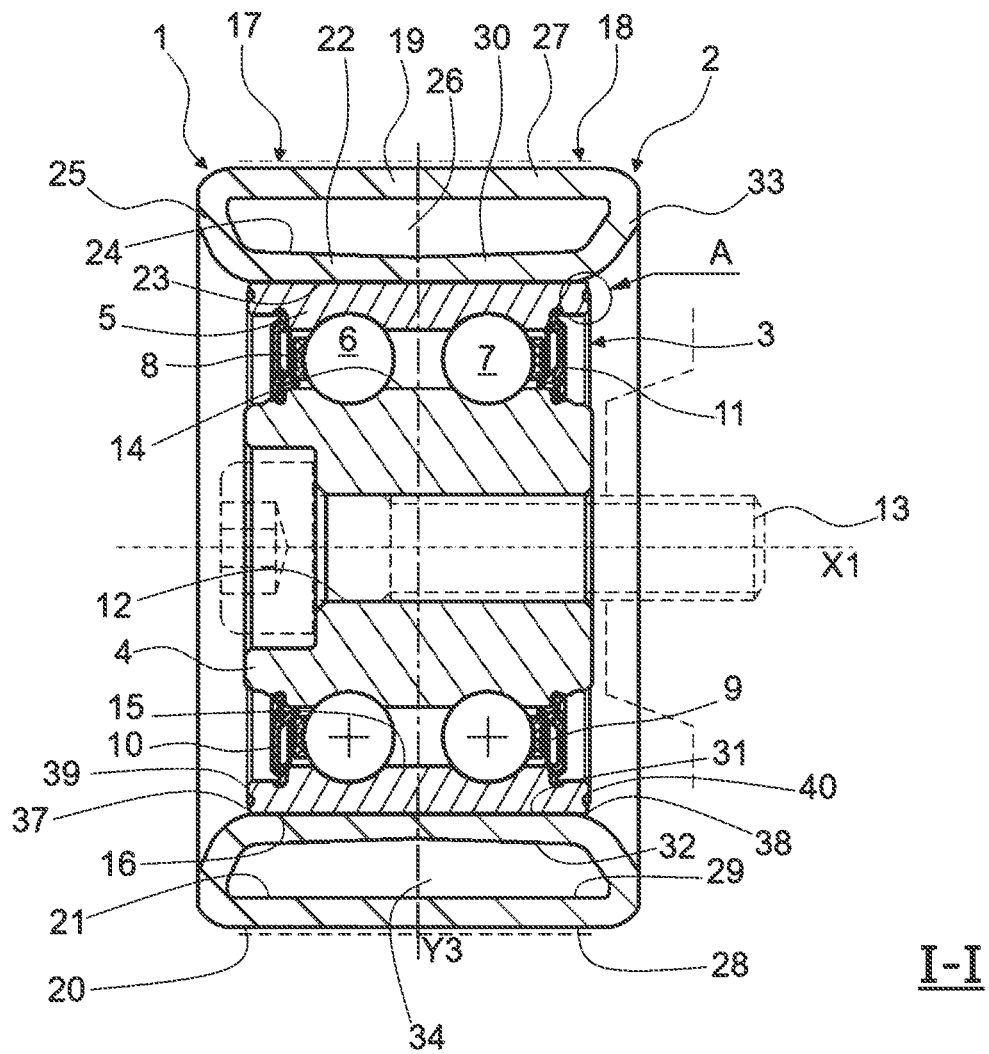
FIG. 4 is an axial section of a pully device having a single pulley part.

The pulley device 1 as illustrated in FIGS. 1 to 3 is suitable for a belt or chain tensioning idler or runner roller, and comprises a pulley 2 adapted to interact with a belt or chain (not shown) and a rolling bearing 3 with a geometric axis X1.

The rolling bearing comprises a fixed inner ring 4 and a rotatable outer ring 5 between which are housed two rows of rolling elements 6 and 7, which in this case are balls, two annular cages 8, 9 respectively maintaining the circumferential spacing of the rolling elements 6, 7, and two annular seals 10, 11.

The inner ring 4 and the outer ring 5 are concentric and symmetric with respect to a transverse radial plane Y3 passing through the centre of the rolling bearing 3. The rings 4, 5 are advantageously of solid type. A solid type is to be understood as a ring obtained by machining with removal of material, by machining, grinding, from a metal tube stock, bar stock, rough forgings and/or rolled blanks.

The inner ring 4 comprises a bore 12 dedicated to receive a fastening screw 13 (in dotted line) to fasten the device 1 on an external support. The inner ring further comprises an outer cylindrical surface 14 onto which toroidal circular raceways are formed, the raceways having in cross section a concave internal profile adapted to the rolling elements 6, 7.

The outer ring 5 comprises a cylindrical bore 15 onto which toroidal circular raceways are formed, the raceways having in cross section a concave internal profile adapted to receive the rolling elements 6, 7. The outer ring 5 further comprises an outer cylindrical surface 16.

The pulley 2 has two pulley parts 17, 18, both having in cross section an overall shape of a C.

The first pulley part 17 comprises an axial annular outer portion 19 providing a cylindrical outer surface 20 designed to interact with a portion of the belt of the chain, and a cylindrical inner surface or bore 21.

The first pulley part 17 also comprises an axial annular inner portion 22 providing a cylindrical inner surface or bore 23 into which the outer cylindrical surface 16 of outer ring 5 of bearing 3 is mounted, and a cylindrical outer surface 24.

The outer portion 19 is of larger diameter than that of the inner portion 22, the outer portion 19 radially surrounding the inner portion 22. Advantageously, the outer portion 19 is of greater axial length than that of the inner portion 22, the outer portion 19 protruding axially on at least one axial side of the inner portion 22.

The first pulley part 17 further comprises an annular radial intermediate portion 25 extending substantially radially between axial ends of inner and outer cylindrical portions 22, 19 on a first axial side of pulley device 1.

The first pulley part 17 then has in cross section an overall shape of a C, defining an open end 26 on one axial side of the pulley device 1. The first pulley part 17 is formed integral.

The second pulley part 18 comprises an axial annular outer portion 27 providing a cylindrical outer surface 28 designed to interact with a portion the belt of the chain, and a cylindrical inner surface or bore 29.

The second pulley part 18 also comprises an axial annular inner portion 30 providing a cylindrical inner surface or bore 31 into which the outer cylindrical surface 16 of outer ring 5 of bearing 3 is mounted, and a cylindrical outer surface 32.

The outer portion 27 is of larger diameter than that of the inner portion 30, the outer portion 27 radially surrounding the inner portion 30. Advantageously, the outer portion 27 is of greater axial length than that of the inner portion 30, the outer portion 27 protruding axially on at least one axial side of the inner portion 30.

The second pulley part 18 further comprises an annular radial intermediate portion 33 extending substantially radially between axial ends of inner and outer cylindrical portions 30, 27 on a second axial side of pulley device 1, the second axial side being axially opposite to the first axial side.

The second pulley part 18 then has in cross section an overall shape of a C, defining an open end 34 on one axial side of the pulley device 1. The second pulley part 18 is formed integral.

Advantageously, the pulley parts 17, 18 are both made of thin metal sheet or blank by folding, cutting and stamping.

Advantageously, the two C-shaped pulley parts 17, 18 are symmetrical with each other with respect to the radial plane Y3. The free ends of outer portions 19, 27 of first and second pulley parts 17, 18 respectively come into contact in an axial direction, the open ends 26, 34 respectively being axially open to each other. The two outer cylindrical surfaces 20, 28 form a surface dedicated to interact with the belt or the chain. The pulley 2 formed by the two pulley parts 17, 18 arranged in axial contact with each other is suitable for guiding, supporting the belt of the chain with an efficient manner.

According to the invention, the outer cylindrical surface 16 of outer ring 5 of bearing 3 comprises a plurality of material deformations 37, 38. The material deformations 37 are provided to a first radial lateral surface 39 on a first axial side of the outer ring 5, and material deformations 38 are provided to a second radial lateral surface 40 on a second axial side, the surfaces 39, 40 being opposite with respect to the radial plane Y3. The material deformations 37, 38 are circumferentially spaced around the lateral surfaces 39, 40 of outer ring 5.

The material deformations 37, 38 are radially outwardly protruding towards the pulley parts 17, 18, respectively. The material deformations 37, 38 radially extend out of the cylindrical outer surface 16 of outer ring 15. Advantageously, the protruding material deformations 37, 38 are each formed by axial crimping of the radial lateral surfaces 39, 40, respectively, towards the opposite axial side.

In the illustrated embodiment of FIG. 2, the material deformations 37, 38 are symmetric with respect to the central radial plane Y3. Alternatively, the material deformations may be not symmetric. In the illustrated embodiment of FIG. 1, the outer ring 5 comprises four material deformations 37, 38 on each lateral surface. Alternatively, the outer ring may comprise one to three material deformations on each outer ring lateral surface, or more than four. In the illustrated embodiment of FIG. 1, the material deformations 37, 38 are circumferentially equally spaced. Alternatively, the material deformations may be unevenly circumferentially spaced.

As illustrated in FIG. 3, the protruding material deformations 38 come in abutment against the corner defined between the inner portion 30 and the intermediate portion 33 of second pulley part 18. The radial deformations 38 form axial stops for the pulley part 18 in a second axial direction. Symmetrically and similarly, the protruding material deformations 37 come in abutment against the corner defined between the inner portion 22 and the intermediate portion 25 of first pulley part 17. The radial deformations 37 form axial stops for the pulley part 17 in a first axial direction. The pulley 2 comprising the two pulley parts 17, 18 is axial abutment is then axially blocked in both axial directions with respect to the outer ring 5 of bearing 3. Even in case of heavy vibrations or shocks, the pulley 2 is prevented for axial movement and is suitable to efficiently support the belt of the chain for an increased and efficient service life.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved pulley device.

Moreover, various features of the above-described representative examples, as well as the various independent and dependant claims below, may be combined in ways that are not specifically and explicitly enumerated in order to provide additional useful embodiments of the present teachings.

The invention claimed is:

1. A pulley device suitable for a belt of chain tensioning idler or runner roller, comprising:
    a bearing having a rotatable outer ring and a fixed inner ring, the rings being coaxial; and
    a pulley provided with at least one pulley part having an overall shape of a C in cross section, and having an inner cylindrical portion with an inner cylindrical surface mounted on an outer cylindrical surface of the outer ring of bearing, an outer cylindrical portion having an outer cylindrical surface configured to be in contact with a belt or a chain, and a radial intermediate portion extending substantially radially between axial ends of inner and outer cylindrical portions on one axial side of the pulley device, the at least one pulley part being formed integral and defining an open end on one axial side opposite to the radial intermediate portion; wherein
    the outer ring is provided with at least one material deformation on a radial lateral surface on the axial side of the radial intermediate portion of the at least one pulley part, the at least one material deformation radially protruding out of the outer cylindrical surface of the outer ring, the at least one material deformation forming an axial stop for the at least one pulley part in one axial direction.

2. The pulley device according to claim 1, wherein the pulley is formed by only one pulley part.

3. The pulley device according to claim 1, wherein the pulley comprises two C-shaped pulley parts mounted onto the outer cylindrical surface of the outer ring of the bearing, open ends of the pulley parts axially facing each other, free ends of outer cylindrical portions of the pulley parts being in axial abutment.

4. The pulley device according to claim 3, wherein the two pulley parts are symmetrical with respect to a transverse radial plane passing through a center of the bearing.

5. The pulley device according to claim 3, wherein both radial lateral surfaces of the outer ring are each provided with at least one material deformation to form axial stops for radial intermediate portions of both pulley parts in both axial directions.

6. The pulley device according to claim 1, wherein the at least one material deformation is formed by axial crimping of the radial lateral surface towards the opposite axial side.

7. The pulley device according to claim 1, wherein the radial lateral surface comprises a plurality of material deformations.

8. The pulley device according to claim 7, wherein the plurality of material deformations are circumferentially equally spaced.

* * * * *